(12) United States Patent
Brinker et al.

(10) Patent No.: US 10,164,716 B2
(45) Date of Patent: Dec. 25, 2018

(54) CONTACTLESS COMMUNICATION BETWEEN ROTATING AND STATIONARY COMPONENTS

(71) Applicant: Distek, Inc., North Brunswick, NJ (US)

(72) Inventors: Jeffrey Brinker, Westfield, NJ (US); Wenyu Wang, Pennginton, NJ (US)

(73) Assignee: Distek, Inc., North Brunswick, NJ (US)

( * ) Notice: Subject to any disclaimer, the term of this patent is extended or adjusted under 35 U.S.C. 154(b) by 0 days.

(21) Appl. No.: 15/557,084

(22) PCT Filed: Mar. 7, 2016

(86) PCT No.: PCT/US2016/021174
§ 371 (c)(1),
(2) Date: Sep. 9, 2017

(87) PCT Pub. No.: WO2016/144867
PCT Pub. Date: Sep. 15, 2016

(65) Prior Publication Data
US 2018/0048395 A1 Feb. 15, 2018

Related U.S. Application Data

(60) Provisional application No. 62/129,676, filed on Mar. 6, 2015.

(51) Int. Cl.
*H04B 10/50* (2013.01)
*H04B 10/80* (2013.01)
(Continued)

(52) U.S. Cl.
CPC ............ *H04B 10/80* (2013.01); *B23Q 17/00* (2013.01); *G08C 23/04* (2013.01); *H04B 10/22* (2013.01);
(Continued)

(58) Field of Classification Search
CPC .......... H04B 10/50; H04B 10/60; H04B 10/80
See application file for complete search history.

(56) References Cited

U.S. PATENT DOCUMENTS 5,589,649 A   12/1996   Brinker et al.
6,353,693 B1   3/2002   Kano et al.
(Continued)

FOREIGN PATENT DOCUMENTS

CN   101650259 A   2/2010

OTHER PUBLICATIONS

"How Ariso Contactless Connectivity Provides Innovative, New Ways to Solve Customers' Connectivity Challenges," Ariso Executive Brief, 2012, as retrieved from: https://www.ttiinc.com/content/ttiinc/en/manufacturers/t-z/te-connectivity/resources/ariso-executive-brief.html, 7 pages.

(Continued)

*Primary Examiner* — Dzung D Tran
(74) *Attorney, Agent, or Firm* — Mendelsohn Dunleavy, P.C.; Steve Mendelsohn

(57) ABSTRACT

In one embodiment, a dissolution-testing apparatus uses a contactless communication system in place of a conventional slip ring. The communication system has a rotating infra-red (IR) communicator and a stationary IR communicator. The dissolution-testing apparatus includes a stationary base having a processor and a rotating shaft having a sensor array including at least a first sensor. The rotating communicator is part of a rotating communication module including a battery and a housing and adapted to be fixed to the shaft for rotation with the shaft. The stationary communicator is adapted to be fixed to the stationary base. The rotating communicator is adapted to (i) receive data from the first sensor while the rotating communicator rotates and (ii) transmit data corresponding to the sensor data to the sta- (Continued)

tionary communicator in a contactless manner while the rotating communicator rotates with respect to the stationary communicator.

30 Claims, 5 Drawing Sheets

(51) Int. Cl.
   *G08C 23/04* (2006.01)
   *H04B 10/00* (2013.01)
   *H04Q 9/00* (2006.01)
   *B23Q 17/00* (2006.01)
   *H04B 10/60* (2013.01)

(52) U.S. Cl.
   CPC ............ *H04B 10/50* (2013.01); *H04B 10/60* (2013.01); *H04Q 9/00* (2013.01); *H04Q 2209/88* (2013.01)

(56) References Cited

U.S. PATENT DOCUMENTS

| | | | |
|---|---|---|---|
| 2009/0199668 A1* | 8/2009 | Batosky | F16H 25/2015 74/424.71 |
| 2013/0322889 A1 | 12/2013 | Graf | |
| 2015/0069852 A1* | 3/2015 | Lindstrom | H04B 5/0031 307/104 |
| 2015/0228403 A1* | 8/2015 | Zwemmer | H01F 38/18 307/104 |
| 2015/0372751 A1* | 12/2015 | Shinoda | H01Q 7/00 455/66.1 |

OTHER PUBLICATIONS

International Search Report and Written Opinion; dated Jul. 1, 2016 for PCT Application No. PCT/US2016/021174.
Written Opinion; dated Jan. 31, 2017 for PCT Application No. PCT/US2016/021174.
International Preliminary Report on Patentability; dated May 22, 2017 for PCT Application No. PCT/US2016/021174.

* cited by examiner

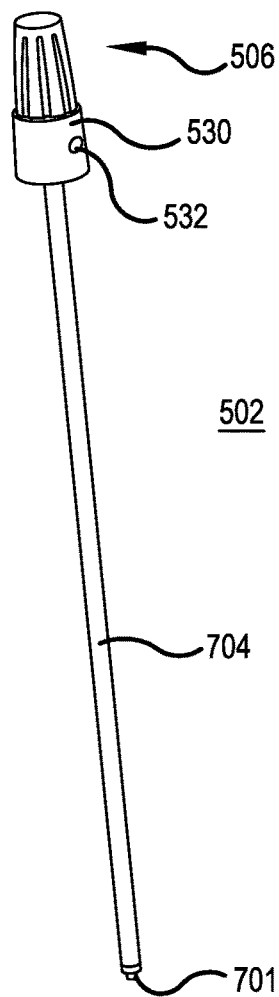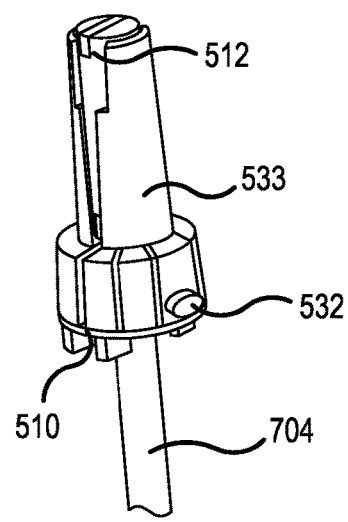
FIG.7
FIG.8

CONTACTLESS COMMUNICATION BETWEEN ROTATING AND STATIONARY COMPONENTS

This application claims the benefit of the filing date of U.S. Provisional Application No. 62/129,676 filed on 6 Mar. 2015, the teachings of which are incorporated herein by reference in their entirety.

BACKGROUND

The present invention relates generally to sensors, and more particularly, but not exclusively, to communication between a stationary component and one or more sensors located on a rotating component.

Maintaining an electrical connection between a stationary element and a rotating element often requires solutions that avoid static wires between the elements since, for example, a sensor located on a continuously rotating shaft would likely eventually tear out a conductive wire connecting the rotating sensor to a stationary signal processor located off the rotating shaft.

Slip rings are electromechanical devices that enable power and/or electrical signals to be transmitted between a rotating component and a stationary component. Slip rings are used in a variety of devices, including dissolution test instruments, radar antennas, gun turrets, periscopes, electro-optic sensor gimbals, and helicopter rotors. A conventional slip ring employs a stationary brush-like graphite or metal contact that rubs against the outside diameter of a corresponding rotating metal ring. The brush is electrically connected to the stationary component, and the corresponding metal ring is electrically connected to the rotating component. As the metal ring turns, the stationary brush provides a conductive path for electrical current to the metal ring to complete the connection between the stationary component and the rotating component. Problematically, these slip rings introduce electrical noise to the signal—which is detrimental to signal transmission. In addition, these slip rings typically need maintenance to avoid the degradation of the rotating electrical connection caused by debris and normal wear.

An improvement over the conventional brush-like slip ring is a mercury-filled slip ring coupled to a wired stationary element and a rotating shaft. An exemplary usage of a mercury-filled slip ring is described in U.S. Pat. No. 5,589,649 for a dissolution testing apparatus, which is incorporated by reference in its entirety herein. A mercury-filled slip ring uses a pool of liquid mercury instead of a brush to maintain electrical contact between a stationary component and a corresponding rotating component. Mercury-filled slip rings provide low resistance and stable connectivity, which, together, greatly reduce (i) electrical noise introduced into transmitted signals, as well as (ii) the ordinary debris and wear from brush slip rings. The low noise is particularly important for systems that transmit data signals across the slip ring.

However, mercury—in both its liquid and gaseous states—is toxic and, consequently, mercury-filled slip rings are not suitable for many applications, including food manufacturing and processing, pharmaceutical equipment, or other applications in which contamination poses a health risk due to potential mercury leakage. Additionally, since mercury solidifies at approximately −40° C., mercury slip rings are not suitable for use at lower temperatures.

SUMMARY

One embodiment of the disclosure can be an article of manufacture comprising a stationary component and a rotatable component configured to rotate with respect to the stationary component. The stationary component comprises a stationary communicator. The rotatable component comprises a rotatable communicator connected to rotate with the rotatable component with respect to the stationary communicator of the stationary component, wherein the stationary and rotatable communicators communicate in a contactless manner while the rotatable component rotates with respect to the stationary component.

BRIEF DESCRIPTION OF THE DRAWINGS

Other aspects, features, and advantages of the disclosure will become more fully apparent from the following detailed description, the appended claims, and the accompanying drawings in which like reference numerals identify similar or identical elements.

FIG. 7 is a perspective view of the rotating portion of FIG. 5.

FIG. 8 is a perspective, partial view of the rotating portion of FIG. 7.

DETAILED DESCRIPTION

In one embodiment of the invention, as described below, an infrared-based contactless electrical transmission system is used in the transmission path of data between a rotating element and a stationary element. Specifically, the rotating element is a sensor (e.g., a temperature sensor) on a rotating stirring shaft of a dissolution-testing apparatus and the stationary element is a control system of the dissolution-testing apparatus.

Figure 1:
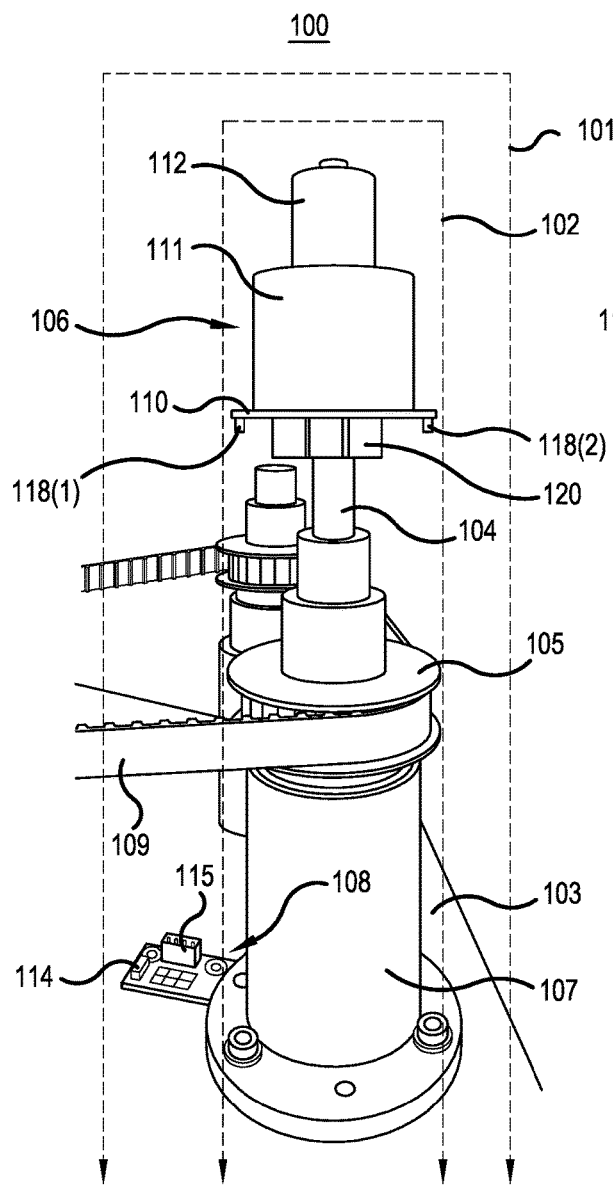
FIG. 1 is a perspective, partial view of dissolution-testing apparatus in accordance with one embodiment of the invention.
Figure 2:
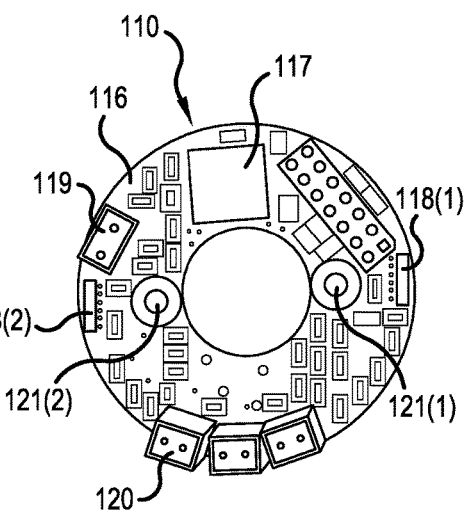
FIG. 2 is a plan view of the rotating contactless communicator of FIG. 1.
Figure 3:
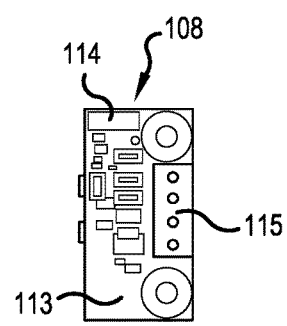
FIG. 3 is a plan view of the stationary contactless communicator of FIG. 1.
Figure 4:
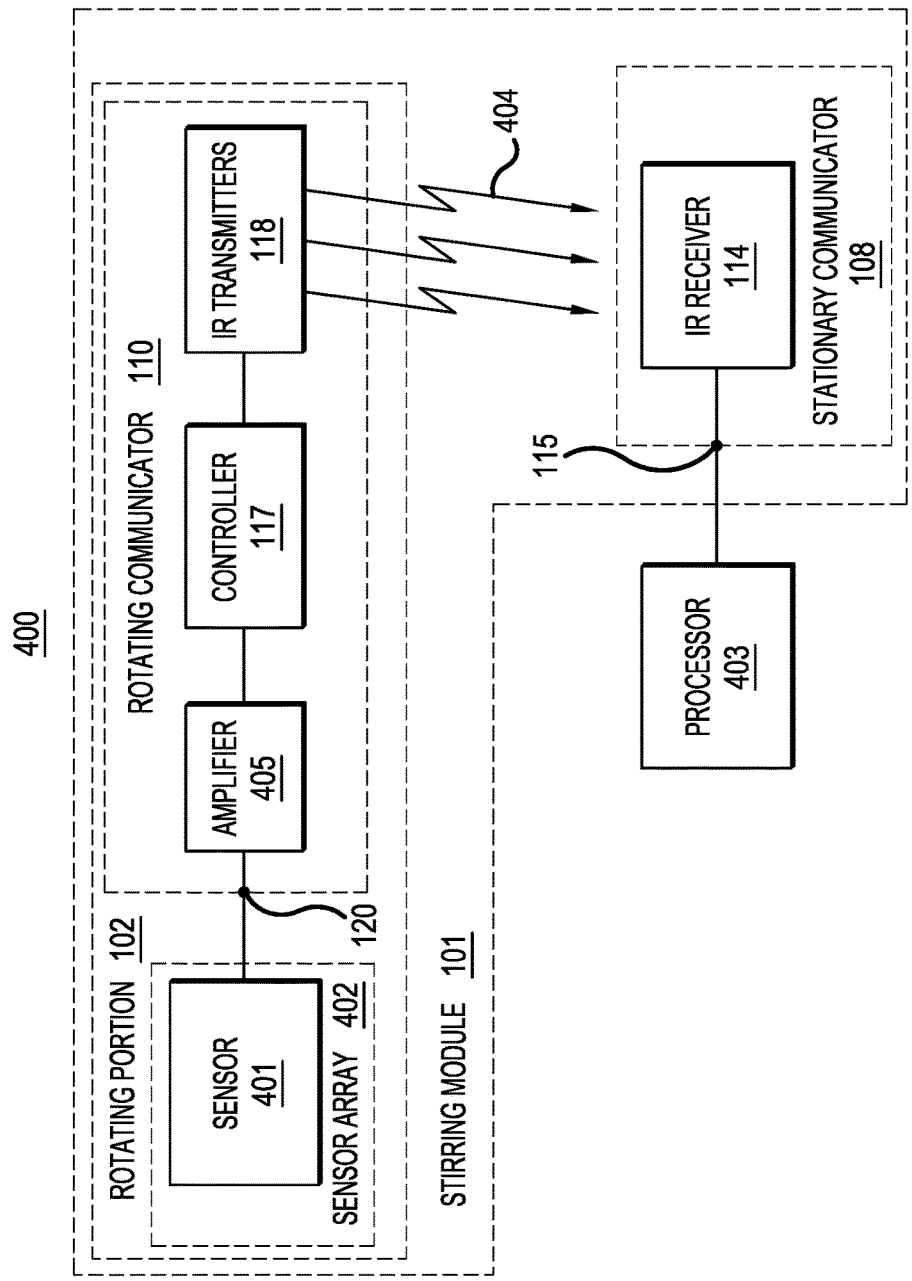
FIG. 4 is a simplified block diagram for the apparatus of FIG. 1.

FIG. 1 is a perspective, partial view of a dissolution-testing apparatus 100 in accordance with one embodiment of the invention. FIG. 2 is a plan view of the rotating contactless communicator 110 of FIG. 1. FIG. 3 is a plan view of the stationary contactless communicator 108 of FIG. 1. FIG. 4 is a simplified block diagram for a sub-system 400 of the apparatus 100 of FIG. 1. The dissolution testing apparatus 100 comprises a base 103, which supports a stirring module 101 and a corresponding dissolution-testing vessel (not shown). The stirring module 101, together with a processor 403 of the apparatus 100, make up the sub-system 400 of FIG. 4.

Note that only a portion of the stirring module 101 is shown in FIG. 1. Also note that the apparatus 100 may have additional stirring modules (not shown) substantially identical to stirring module 101, as well as other additional components (not shown), such as, for example, an input device and a display.

The stirring module 101 comprises a rotating portion 102 that includes a stirring shaft 104, a timing pulley 105, and a rotating communication module 106. The stirring module 101 further comprises a stationary hub 107 and a stationary contactless communicator 108. Note that the stationary hub 107 may be a spindle housing. The rotating communication module 106 comprises the rotating contactless communicator 110, a housing 111, and a battery 112. The housing 111 houses the battery 112. The battery 112 may be, for example, a long-life lithium battery, an alkaline battery, or a rechargeable battery. The rotating communication module may also include a fuse (not shown) between the battery 112 and the rotating communicator 110 in order to reduce the chance of damage to the rotating communication module 106 from electrical anomalies.

The timing pulley 105 is rigidly attached to the stirring shaft 104 and is adapted to be rotated by a timing belt 109. The timing belt 109 may be powered by a motor (not shown) of the dissolution-testing apparatus 100. The stationary hub 107 holds the stirring shaft 104 in place and includes bearings (not shown) to allow the stirring shaft 104 to rotate in response to being driven by the motor via the timing belt 109 and the timing pulley 105.

The stationary communicator 108 comprises a printed circuit board (PCB) 113, an infra-red (IR) receiver 114, and a cable connector 115, as well as additional circuit components (not labeled)—such as, e.g., resistors, capacitors, and/or transistors—and conductive paths (not labeled) that interconnect the various components of the stationary communicator 108. The IR receiver 114, which faces up towards the rotating communicator 110, is adapted to receive IR data transmissions—in other words, to generate a corresponding electrical signal in response to detected IR radiation. The cable connector 115 is adapted to receive and conductively connect to wires (not shown in FIG. 1) connected to the processor 403, which processes the electrical signal output by the stationary communicator 108. The electrical signal output by the stationary communicator 108 is based on the sensor data received from a below-described sensor array of the rotating portion 102—via the rotating communicator 110. The processor 403 may perform some corresponding action based on the received sensor data, such as, for example, having the sensor data displayed and/or recorded.

The processor 403 may also, for example, heat up the corresponding vessel in response to a low temperature reading in order to bring the temperature of the medium (not shown) in the vessel to a desired temperature. The processor 403 may also control the operation of the stationary communicator 108. In some alternative embodiments, the stationary communicator 108 may include a local controller (not shown) to control the operation of the stationary communicator 108. Note that the processor 403 may be, for example, a shared central processor for all of the stirring modules of the apparatus 100 or a processor corresponding to only the stirring module 101.

The rotating communication module 106 is located at a first end of the stirring shaft 104 and is attached to the stirring shaft 104—either directly or using another component—to rotate together with the stirring shaft 104. A sensor array 402 is located at or towards the other, opposite, end (not shown) of the stirring shaft 104. The sensor array 402 is adapted to form an electrical circuit together with the rotating communication module 106—corresponding to the rotating portion 102. Specifically, the rotating communicator 110 of the rotating communication module 106 is adapted to conductively connect to the sensor array 402 to provide electrical power (e.g., from the battery 112) to the sensor array 402 and to read sensed information from the sensor array 402. The sensor array 402 may comprise one or more sensors 401 to sense, for example, temperature (e.g., using a resistance temperature detector (RTD)), pH level, dissolved oxygen (DO) level, oxygenation-reduction (redox) potential (ORP), vibration amount, humidity level, pressure, tilt, position, electrical current level, and/or voltage level. The rotating communicator 110 is, in turn, adapted to communicate data received from the sensor array 402 to the stationary communicator 108, as described further below.

The rotating communicator 110 comprises an annular PCB 116, a controller 117, two infra-red (IR) transmitters 118(1)-(2), power-cable connector 119, one or more sensor-cable connector 120, and screw holes 121(1)-(2), as well as additional circuit components—such as, e.g., amplifier 405 and resistors, capacitors, and/or transistors (not labeled in FIG. 2) and conductive paths (not labeled) that interconnect the various components of the rotating communicator 110. The rotating communicator 110 is attached to the housing 111 using, for example, screws (not shown) through the screw holes 121.

The components of the rotating communicator 110 may be low-power components. For example, the controller 117 may be an ultra-low-power microcontroller unit (MCU), and the IR transmitters 118 may be low-power IR transmitters. The controller 117 may employ energy-saving power-management techniques to reduce power usage by the rotating portion 102. For example, the controller 117 may selectively provide power to select components of the rotating portion 102 only when those components need to be in use and, conversely, cut off power to those select components when those components do not need to be actively in use (e.g., when the component are in an idle state).

The selection of providing or denying power may be based on time, sensor input, user input, and/or other logic. For example, (i) signal-conditioning components—such as, for example, the amplifier 405—may be powered only when measurements are executed and (ii) communication components—such as, for example, the IR transmitters 118—may be powered only when transmissions are necessary. As further example, the controller 117 may limit turning on the IR transmitters 118 by limiting sensor-value transmissions to only new sensor values, where a new sensor value is either a value received after a reset of the rotating communicator 110 or a value different by some threshold from the last transmitted value. Alternatively, transmissions by the IR transmitters 118 may be limited to intermittent transmissions of optionally adjustable time intervals. Note that power management of the rotating portion 102 may be—additionally or alternatively—controlled by the processor 403.

The power-cable connector 119 is adapted to accept and conductively connect to wires (not shown) connected to the battery 112 to provide power to the rotating communicator 110 and, as needed, to the sensors 401 of the sensor array 402. One or more of the sensor-cable connectors 120 are adapted to accept and conductively connect to wires (not shown in FIG. 1) from sensors 401 of the sensor array 402 to provide power to, and receive feedback from, the sensors 401. These wires from the sensors 401 may be threaded through the stirring shaft 104, which may be hollow.

The sensor 401 provides an analog signal via the connector 120 to the optional amplifier 405 of the rotating communicator 110, which, in turn, provides the amplified signal to the controller 117. Note that the analog signal provided by the sensor 401 may be provided by one or more conductive paths. Note that the amplifier 405 may be a differential amplifier having at least one input connected to the sensor 401. Note that, because of the electrical isolation of the rotating communication module 106, the rotating communicator 110 has high noise immunity and provides a superior common-mode rejection ratio for analog signals received from the sensor 401 in common mode.

The controller 117 digitizes the signal from the sensor 401 (optionally via the amplifier 405) at a selected resolution, performs any necessary processing and/or modulation, and controls the IR transmitters 118 to output a corresponding IR signal 404. Data from different sensors 401 of the sensor array 402 may be differentiated by, for example, having the controller 117 append unique corresponding identifiers to the transmitted values. Note that, as used herein, the phrase appending an identifier includes adding an identifier as a suffix, prefix, and/or infix to the transmitted value.

Note that alternative embodiments may use any suitable systems and/or methods for differentiating data from different sensors 401 of the sensor array 402—e.g., by using multi-channel A/D converters. Note that the controller 117 may have additional input and/or output nodes (not shown) that may be used for, for example, programming the controller 117, setting parameters used by the controller 117, and/or controlling other components (not shown) of the stirring module 101. Parameters used by the controller 117 may be set by, for example, reading the status of a switch (not shown). The controller 117 may include programmable non-volatile memory (not shown) that may be used to store parameters as needed. The parameters may include, e.g., identification and calibration information for the sensors 401 of the sensor array 402. Note that the calibration information may be generated in conjunction with, or under the control of, the processor 403, which may communicate with the controller 117 using an IR transmitter (not shown) in the stationary communicator 108 and an IR receiver (not shown) in the rotating communicator 110.

The IR transmitters 118—located on opposite sides of the rotating communicator 110 and facing down towards the IR receiver 114 of the stationary communicator 108—may be light-emitting diodes (LEDs) that emit invisible light signal 404 in the infra-red range. IR transmission is useful because it allows for the transmission of digital data over a short distance at a high throughput using relatively low power and without generating output that may be sensed by—and may be disturbing to—people in the vicinity. The operation of the rotating communicator 110 in general—and of the IR transmitters 118 in particular—is controlled by the controller 117.

The rotating communicator 110 has a plurality of IR transmitters 118 adapted to simultaneously transmit the same information in order to account for the intermittent blocking of the line of sight as the rotating communicator 110 rotates with the stirring shaft 104. Specifically, the line of sight from a first IR transmitter 118(1) to the IR receiver 114 of the stationary communicator 108 is intermittently blocked whenever the rotation of the rotating communicator 110 brings the first IR transmitter 118(1) to a position where the stirring shaft 104 blocks the line of sight from the first IR transmitter 118(1) to the IR receiver 114. Since, when the first IR transmitter 118(1) is in the blocked position, the second IR transmitter 118(2) is on the opposite side of the rotating communicator 110, the second IR transmitter 118(2) has a clear line of sight to the IR receiver 114 that is not blocked by the stirring shaft 104—and the transmission from the rotating communicator 110 to the stationary communicator 108 can, consequently, continue uninterrupted. Similarly, when the line of sight from the second IR transmitter 118(2) is blocked by the shaft 104, the first IR transmitter 118(1) has a clear line of sight. Note that, as used herein, the term "line of sight" should be understood in relation to the particular communication radiation used by the communicators. In other words, there is a clear line of sight between the communicators if any objects in the path between the communicators allow the communication radiation used—such as, e.g., IR radiation—to pass through those objects.

Figure 6:
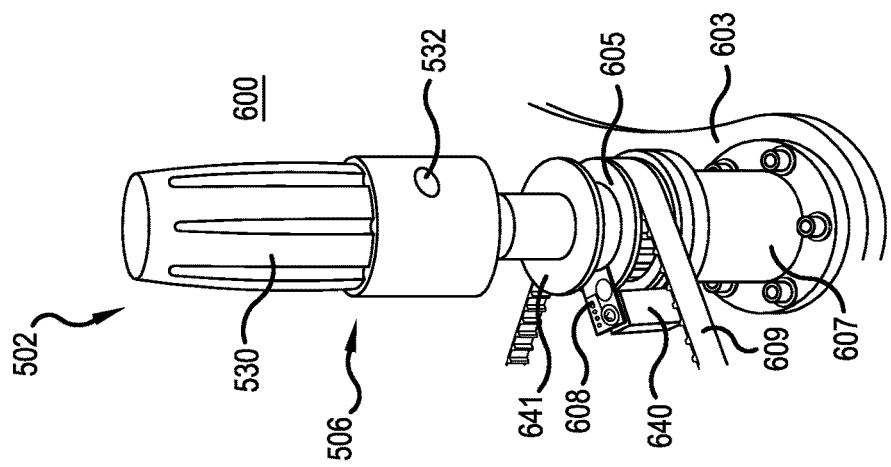
FIG. 6 is a perspective, partial view of a portion of the apparatus of FIG. 5.
Figure 5:
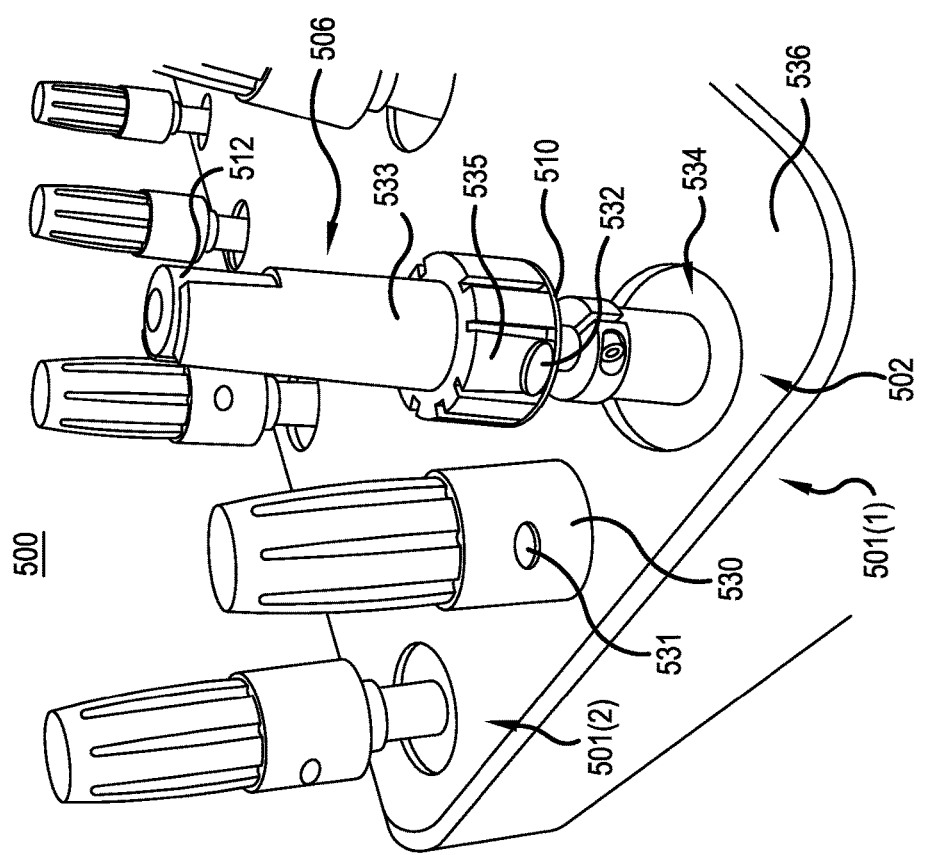
FIG. 5 is a perspective, partial view of a partially disassembled dissolution-testing apparatus in accordance with another embodiment of the invention.
Figures 9, 10:
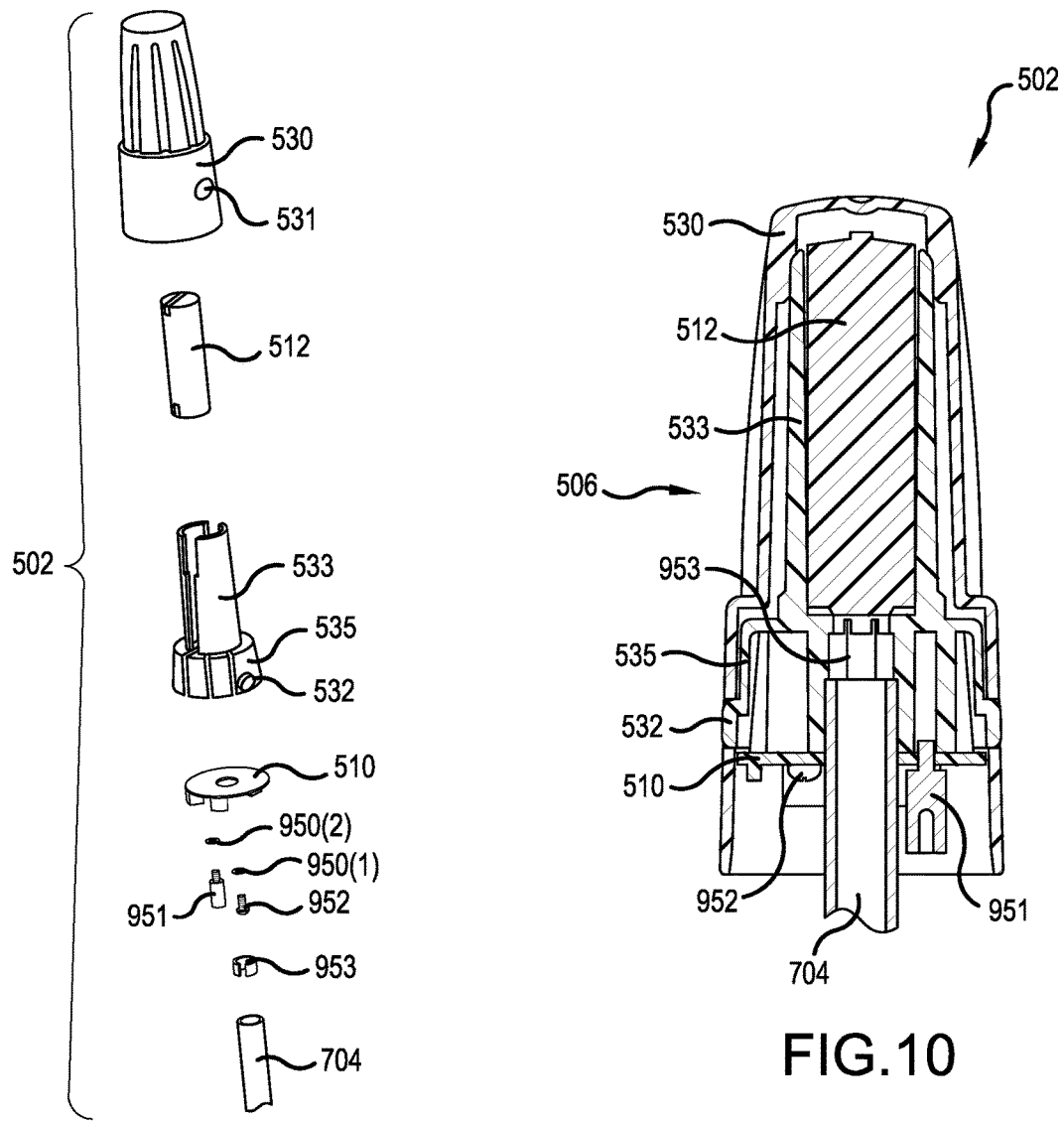
FIG. 9 is an exploded, partial view of the rotating portion of FIG. 7.
FIG. 10 is a cross-sectional, partial view of the rotating portion of FIG. 7.

FIG. 5 is a perspective, partial view of a partially disassembled dissolution-testing apparatus 500 in accordance with another embodiment of the invention. FIG. 6 is a perspective, partial view of a portion 600 of the apparatus 500 of FIG. 5. FIG. 7 is a perspective view of the rotating portion 502 of FIG. 5. FIG. 8 is a perspective, partial view of the rotating portion 502 of FIG. 7. FIG. 9 is an exploded, partial view of the rotating portion 502 of FIG. 7. FIG. 10 is a cross-sectional, partial view of the rotating portion 502 of FIG. 7. Elements of dissolution-testing apparatus 500 that are similar or substantially identical to corresponding elements of the dissolution-testing apparatus 100 of FIG. 1 may be similarly named and similarly labeled, but with a different prefix.

The dissolution-testing apparatus 500 comprises a base 603 that supports a plurality of stirring modules 501 including stirring modules 501(1) and 501(2). Note that the base 603 may be referred to as a vessel support plate. The apparatus 500 also includes a top cover 536 that has a plurality of apertures 534 corresponding to the stirring modules 501. Each stirring module 501 includes a rotating portion 502 and a stationary communicator 608. The rotating portion 502 includes a stirring shaft 704, a rotating communication module 506 at a top end, and a sensor 701 at a bottom end. The dissolution-testing apparatus 500 includes a motor (not shown) for spinning the rotating portion 502. The rotating portion 502 include a stationary hub 607, a timing pulley 605, and a corresponding timing belt 609, which is mechanically connected to the motor.

The stationary communicator 608 is attached to the stationary hub 607 by a support structure 640. The stationary communicator 608 is located under the top cover 536. The rotating portion 502 may include an optional protective cover 641 located between the stationary communicator 608 and the rotating communicator 510. The protective cover 641 allows IR signals to pass through and may function as an IR lens to, for example, focus, collimate, or otherwise enhance IR radiation from the rotating communicator 510 to the stationary communicator 608. The diameter of the apertures 534 is sized large enough to accommodate not only a corresponding section of the rotating portion 502, but also lines of sight between the stationary communicator 608 and the rotating communication module 506.

The rotating communications module 506 has an external housing 530 and an internal housing 533. In FIG. 5, the rotating communications module 506 of the stirring module 501(1) is partially disassembled with the external housing 530 resting on the top cover 536 near the internal housing 533. The communications module further includes a battery 512 and a rotating communicator 510. The rotating communicator 510 is attached to the internal housing 533 with a screw 952. The rotating communications module 506 may include an optional standoff screw 951, which functions as a protection spacer to prevent damage to the components of the rotating communicator 510 from other components of the apparatus 500. The screw 952 and standoff screw 951 may be separated from the surface of the rotating communicator 510 by optional washers 950. The rotating communication module 506 may also includes a C-spacer 953, if needed for proper attachment of the stirring shaft 704 to the internal housing 533 and/or to provide an opening for the wires (not shown) from the sensor 701 to the rotating communicator 510.

The internal housing 533 has two flexible tabs 535 with corresponding projections 532. The external housing 530 has two apertures 531 corresponding to the projections 532, each aperture 531 sized to admit the corresponding projection 532 such that, when the projections 532 are inside the corresponding apertures 531, the external housing 530 is securely attached to the internal housing 533. The projections 532 may be pressed in so that the tabs 535 are bent inwards, the projections 532 clear the walls of the external housing 530, and the external housing 530 may consequently be removed to partially disassemble the rotating communication module 506, as shown in FIG. 5. Note that alternative embodiments may use a different number of projections and corresponding apertures or any other suitable means for securing an external housing to an internal housing, such as, for example, threads, tongues-and-grooves, and/or fasteners.

Embodiments of the invention have been described where power is provided to the rotating communication module by a battery that is part of the rotating communication module. The invention is not, however, so limited. In alternative embodiments, alternative power sources may be used—instead of, or in addition to, a battery—to provide electrical power to the rotating communication module. For example, in some alternative embodiments, the rotating communication module may include an energy-harvesting device that may generate electricity from, for example, the rotation of the rotating communication module, from radiation directed at the energy-harvesting device, or from ambient radiation.

Embodiments of the invention have been described where conductive wires are connected to the stationary and rotating communicators using wire connectors such as connectors 120, 119, and 115. The invention is not, however, so limited. Alternative embodiments of the invention may use—in addition to, or instead of, connectors—any suitable means for connecting conductive wires to the stationary and/or rotating communicators, such as, for example, sockets, soldering, or wire-twisting connectors.

Embodiments of the invention have been described where the rotating communicator has two IR transmitters and the stationary communicator has one IR receiver. The invention is not, however, so limited. Alternative embodiments of the invention may have a rotating communicator with fewer or more IR transmitters. In some alternative embodiments—such as, e.g., embodiments having a rotating communicator with only one IR transmitter—additional software and/or hardware may, for example, (i) prevent transmission when the IR receiver of the stationary communicator is not in the line of sight of the IR transmitter or (ii) account for occasionally blocked transmissions from the IR transmitter to the IR receiver by, for example, (a) transmitting at random or otherwise-varying—i.e., irregular—intervals so as to avoid repeatedly transmitting when blocked and/or (b) re-transmit transmissions at controlled intervals. In some alternative embodiments—such as, e.g., embodiments having a rotating communicator with only one IR transmitter—the corresponding stationary communicator may have two or more IR receivers disposed around the shaft so that there is always a clear line of sight from the IR transmitter of the rotating communicator to at least one of the IR receivers of the stationary communicator.

Embodiments of the invention have been described where the rotating communicator comprises contactless transmitters and the stationary communicator comprises contactless receivers. The invention, however, is not so limited. The rotating communicator may comprise one or more contactless receivers in place of, or in addition to, the contactless transmitters. Similarly, the stationary communicator may comprise one or more contactless transmitters in place of, or in addition to, the contactless receivers. In other words, in some embodiments, the rotating and stationary communicators may use transceivers, which are devices that combine both a transmitter and a receiver. Note that, in some embodiments, a transmitter and receiver of a transceiver may share some or all components—for example, in some embodiments, the transceiver may use the same component to both emit and detect relevant radiation.

Embodiments of the invention have been described where the rotating contactless sensor system is used in dissolution testing equipment. The invention is not, however, so limited. In some alternative embodiments, a rotating contactless sensor system is used in alternative equipment such as, for example, radar antennas, gun turrets, periscopes, electro-optic sensor gimbals, helicopter rotors, or any other electromechanical system that employs unrestrained, intermittent, or continuous rotation while transmitting power and/or data.

Embodiments of the invention have been described where the stirring portions are mechanically connected to a motor via timing belts. The invention is not, however, so limited. In alternative embodiments, the stirring portions may be mechanically connected to be spun by the motor via any other suitable means, such as, for example, gears, non-timing belts, or electromagnets.

Embodiments of the invention have been described where the rotating and stationary communicators use IR communication. However, the invention is not so limited. In alternative embodiments, other contactless methods for communicating wirelessly may be used, including, e.g., radiofrequency (RF) communications, Near-Field Communications (NFC), Radiofrequency Identification (RFID) communications, and the like. Note that IR communication may have particular utility relative to RF/NFC/RFID communication because (i) no pairing is required, (ii) there is no interference from environmental RF signals, (iii) IR emissions are ultra low power so as not to be subject to regulatory requirements, (iv) no communications license is needed from governmental agencies in the countries where the contactless electrical sensor system is being used, and (v) no complex firmware programming is needed. Additionally, if many contactless communicators are employed within a single device or lab, contactless communicators employing RF communications will inevitably suffer from RF emissions and interference problems, which are eliminated with the use of an IR-based contactless electrical sensor system consistent with certain embodiments of the invention.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

The term "nonvolatile memory," as used herein, refers to any type of memory that substantially retains its stored contents after disconnection from its power supply, i.e., the stored contents can be retrieved after reconnecting the nonvolatile memory to a power supply. Examples of nonvolatile memory include, but are not necessarily limited to (i) fuse/antifuse devices such as OTP memory and PROM, (ii) charge-storing devices such as EPROM and EEPROM and flash ROM, (iii) magnetic media devices such as hard drives and tapes, and (iv) optical, opto-electrical, and opto-magnetic media such as CDs and DVDs.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in any following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. An article of manufacture comprising:
    a stationary component; and
    a rotatable component configured to rotate with respect to the stationary component, wherein:
        the stationary component comprises a stationary infrared (IR) communicator;
        the rotatable component comprises a rotatable IR communicator connected to rotate with the rotatable component with respect to the stationary communicator of the stationary component, wherein the stationary and rotatable communicators communicate in a contactless manner while the rotatable component rotates with respect to the stationary component;
        the rotatable communicator comprises a first IR transmitter;
        the stationary communicator comprises first IR receiver;
        the contactless communication between the rotatable communicator and the stationary communicator comprises transmission of an IR signal from the first IR transmitter of the rotatable communicator to the first IR receiver of the stationary communicator;
        the rotatable component further comprises a sensor that rotates with the rotating component;
        while the rotatable components rotates with respect to the stationary component, (i) the sensor provides sensed information to the rotatable communicator, (ii) the first IR transmitter transmits the IR signal to the first receiver, and (iii) the IR signal includes the sensed information; and
        the sensor is electrically connected to the rotatable communicator by a wire.

2. The article of claim 1, wherein the article further comprises one or more additional of the stationary communicator and one or more additional instances of the rotatable communicator.

3. The article of claim 1, wherein:
the sensed information includes a temperature of a medium in a vessel;
the stationary component further comprises a processor that processes the received IR signal; and
the processor is adapted to adjust the temperature of the medium in the vessel in response to the sensed information.

4. The article of claim 1, wherein:
the rotatable component comprises a hollow rotatable shaft that has a first end and a second end opposite the first end;
the rotatable communicator is located at the first end;
the sensor is located at the second end; and
the sensor is electrically connected to the rotatable communicator by the wire threaded through the shaft.

5. The article of claim 4, wherein the rotatable component comprises:
an internal housing located at the first end and adapted to support the rotatable communicator and a battery for powering the rotatable communicator; and
an external housing adapted to detachably attach to the internal housing.

6. The article of claim 1, wherein:
the rotatable communicator further comprises a controller; and
the rotatable component comprises a power source adapted to provide power to the controller, the first IR transmitter, and the sensor.

7. The article of claim 6, wherein the controller is adapted to minimize power use by selectively providing and denying power to elements of the rotatable component.

8. The system of claim 6, wherein the controller comprises a non-volatile memory for storing calibration parameters for the sensor.

9. The article of claim 1, wherein:
the rotatable communicator further comprises a controller; and
the rotatable component comprises a power source adapted to provide power to the controller and the first IR transmitter.

10. The article of claim 1, wherein the rotatable communicator further comprises a second IR transmitter located such that, as the rotatable component rotates with respect to the stationary component, when the line of sight from the first IR transmitter to the first IR receiver is blocked by the rotatable component, the second IR transmitters has a clear line of sight to the first IR receiver.

11. The article of claim 10, wherein the second IR transmitter transmits a copy of the IR signal transmitted by the first IR transmitter.

12. The article of claim 1, wherein the stationary communicator further comprises a second IR receiver located such that at least one of the first and second IR receivers has a clear line of sight to the first IR transmitter of the rotating communicator as the rotatable component rotates with respect to the stationary component.

13. The article of claim 1, wherein:
as the rotatable component rotates with respect to the stationary component, the IR signal from the first IR transmitter to the first IR receiver is occasionally blocked by the rotatable component; and
the first IR transmitter transmits the IR signal at irregular intervals to avoid repeatedly transmitting when blocked.

14. The article of claim 1, wherein:
the rotatable communicator comprises a first transceiver comprising the first infra-red (IR) transmitter and a second IR receiver;
the stationary communicator comprises a second transceiver comprising the first IR receiver and a second IR transmitter; and
the contactless communication between the rotatable communicator and the stationary communicator further comprises transmission of an IR signal from the second IR transmitter of the stationary communicator to the second IR receiver of the rotatable communicator.

15. The article of claim 1, wherein:
the stationary component further comprises a stationary base;
the stationary communicator is fixed to the stationary base;
the rotatable component further comprises a rotating shaft;
the rotatable communicator is fixed to the shaft for rotation with the shaft.

16. The article of claim 15, wherein:
the stationary component includes a stationary hub adapted to house the rotating shaft of the rotatable component; and
the stationary communicator is fixed to the stationary hub.

17. The article of claim 15, wherein the article is a dissolution-testing apparatus.

18. The article of claim 15, wherein:
the stationary component further comprises a cover;
the rotatable communicator is located above the cover;
the stationary communicator is located below the cover;
the cover comprises an aperture corresponding to the stationary communicator and the rotatable communicator; and
the aperture is sized to both receive the rotatable shaft and provide clear lines of sight from the first IR transmitter to the first IR receiver.

19. The article of claim 1, wherein:
the stationary component further comprises a cover;
the rotatable communicator is located above the cover;
the stationary communicator is located below the cover;
the cover comprises an aperture corresponding to the stationary communicator and the rotatable communicator; and
the aperture is sized to both receive the rotatable shaft and provide a clear line of sight from the rotatable communicator to the stationary communicator.

20. An article of manufacture comprising:
a stationary component; and
a rotatable component configured to rotate with respect to the stationary component, wherein:
the stationary component comprises a stationary infra-red (IR) communicator;
the rotatable component comprises a rotatable IR communicator connected to rotate with the rotatable component with respect to the stationary communicator of the stationary component, wherein the stationary and rotatable communicators communicate in a contactless manner while the rotatable component rotates with respect to the stationary component;
the rotatable communicator comprises a first IR transmitter;
the stationary communicator comprises a first IR receiver;
the contactless communication between the rotatable communicator and the stationary communicator comprises transmission of an IR signal from the first IR transmitter of the rotatable communicator to the first IR receiver of the stationary communicator;

the rotatable component further comprises a sensor that rotates with the rotating component;

while the rotatable components rotates with respect to the stationary component, (i) the sensor provides sensed information to the rotatable communicator, (ii) the first IR transmitter transmits the IR signal to the first IR receiver, and (iii) the IR signal includes the sensed information;

the rotatable communicator further comprises a controller;

the rotatable component comprises a power source adapted to provide power to the controller, the first IR transmitter, and the sensor; and the controller is adapted to minimize power use by selectively providing and denying power to elements of the rotatable component.

21. The article of claim 20, wherein the article is a dissolution-testing apparatus.

22. An article of manufacture comprising:
a stationary component; and
a rotatable component configured to rotate with respect to the stationary component, wherein:
the stationary component comprises a stationary infrared (IR) communicator;
the rotatable component comprises a rotatable IR communicator connected to rotate with the rotatable component with respect to the stationary communicator of the stationary component, wherein the stationary and rotatable communicators communicate in a contactless manner while the rotatable component rotates with respect to the stationary component;
the rotatable communicator comprises a first IR transmitter;
the stationary communicator comprises a first IR receiver;
the contactless communication between the rotatable communicator and the stationary communicator comprises transmission of an IR signal from the first IR transmitter of the rotatable communicator to the first IR receiver of the stationary communicator; and
the rotatable communicator further comprises a second IR transmitter located such that, as the rotatable component rotates with respect to the stationary component, when the line of sight from the first IR transmitter to the first IR receiver is blocked by the rotatable component, the second IR transmitters has a clear line of sight to the first IR receiver.

23. The article of claim 22, wherein the second IR transmitter transmits a copy of the IR signal transmitted by the first IR transmitter.

24. The article of claim 22, wherein the article is a dissolution-testing apparatus.

25. An article of manufacture comprising:
a stationary component; and
a rotatable component configured to rotate with respect to the stationary component, wherein:
the stationary component comprises a stationary infrared (IR) communicator;
the rotatable component comprises a rotatable IR communicator connected to rotate with the rotatable component with respect to the stationary communicator of the stationary component, wherein the stationary and rotatable communicators communicate in a contactless manner while the rotatable component rotates with respect to the stationary component;
the rotatable communicator comprises a first IR transmitter;
the stationary communicator comprises a first IR receiver;
the contactless communication between the rotatable communicator and the stationary communicator comprises transmission of an IR signal from the first IR transmitter of the rotatable communicator to the first IR receiver of the stationary communicator; and
the stationary communicator further comprises a second IR receiver located such that at least one of the first and second IR receivers has a clear line of sight to the first IR transmitter of the rotating communicator as the rotatable component rotates with respect to the stationary component.

26. The article of claim 25, wherein the article is a dissolution-testing apparatus.

27. An article of manufacture comprising:
a stationary component; and
a rotatable component configured to rotate with respect to the stationary component, wherein:
the stationary component comprises a stationary infrared (IR) communicator;
the rotatable component comprises a rotatable IR communicator connected to rotate with the rotatable component with respect to the stationary communicator of the stationary component, wherein the stationary and rotatable communicators communicate in a contactless manner while the rotatable component rotates with respect to the stationary component;
the rotatable communicator comprises a first IR transmitter;
the stationary communicator comprises a first IR receiver;
the contactless communication between the rotatable communicator and the stationary communicator comprises transmission of an IR signal from the first IR transmitter of the rotatable communicator to the first IR receiver of the stationary communicator;
as the rotatable component rotates with respect to the stationary component, the IR signal from the first IR transmitter to the first IR receiver is occasionally blocked by the rotatable component; and
the first IR transmitter transmits the IR signal at irregular intervals to avoid repeatedly transmitting when blocked.

28. The article of claim 27, wherein the article is a dissolution-testing apparatus.

29. An article of manufacture comprising:
a stationary component; and
a rotatable component configured to rotate with respect to the stationary component, wherein:
the stationary component comprises a stationary infrared (IR) communicator;
the rotatable component comprises a rotatable IR communicator connected to rotate with the rotatable component with respect to the stationary communicator of the stationary component, wherein the stationary and rotatable communicators communicate in a contactless manner while the rotatable component rotates with respect to the stationary component;

the rotatable communicator comprises a first IR transmitter;

the stationary communicator comprises a first IR receiver;

the contactless communication between the rotatable communicator and the stationary communicator comprises transmission of an IR signal from the first IR transmitter of the rotatable communicator to the first IR receiver of the stationary communicator;

the rotatable communicator comprises a first transceiver comprising the first infra-red (IR) transmitter and a second IR receiver;

the stationary communicator comprises a second transceiver comprising the first IR receiver and a second IR transmitter; and the contactless communication between the rotatable communicator and the stationary communicator further comprises transmission of an IR signal from the second IR transmitter of the stationary communicator to the second IR receiver of the rotatable communicator.

30. The article of claim 29, wherein the article is a dissolution-testing apparatus.

\* \* \* \* \*

UNITED STATES PATENT AND TRADEMARK OFFICE
CERTIFICATE OF CORRECTION

PATENT NO. : 10,164,716 B2
APPLICATION NO. : 15/557084
DATED : December 25, 2018
INVENTOR(S) : Jeffrey Brinker and Wenyu Wang Page 1 of 1

It is certified that error appears in the above-identified patent and that said Letters Patent is hereby corrected as shown below:

In the Claims

Claim 1, Column 10, Line 47, replace "the stationary communicator comprises first IR receiver" with --the stationary communicator comprises a first IR receiver--.

Claim 1, Column 10, Line 59, replace "(ii) the first IR transmitter transmits the IR signal to the first receiver, and (iii) the IR signal includes the sensed information; and" with --(ii) the first IR transmitter transmits the IR signal to the first IR receiver, and (iii) the IR signal includes the sensed information; and--.

Claim 2, Column 10, Line 64, replace "The article of claim 1, wherein the article further comprises one or more additional of the stationary communicator and one or more additional instances of the rotatable communicator." with --The article of claim 1, wherein the article further comprises one or more additional instances of the stationary communicator and one or more additional instances of the rotatable communicator.--.

Signed and Sealed this
Seventeenth Day of September, 2019

Andrei Iancu
*Director of the United States Patent and Trademark Office*